US009894922B2

(12) United States Patent
Markosyan

(10) Patent No.: US 9,894,922 B2
(45) Date of Patent: Feb. 20, 2018

(54) GLUCOSYL REBAUDIOSIDE C

(71) Applicant: PureCircle USA Inc., Oak Brook, IL (US)

(72) Inventor: Avetik Markosyan, Yerevan (AM)

(73) Assignee: PureCircle Sdn Bhd, Kuala Lumpur (MY)

( * ) Notice: Subject to any disclaimer, the term of this patent is extended or adjusted under 35 U.S.C. 154(b) by 403 days.

(21) Appl. No.: 13/929,108

(22) Filed: Jun. 27, 2013

(65) Prior Publication Data

US 2013/0287894 A1   Oct. 31, 2013

Related U.S. Application Data

(63) and a continuation-in-part of application No. 13/100,010, filed on May 18, 2011, now Pat. No. 8,501,261.

(60) Provisional application No. 61/827,941, filed on May 28, 2013.

(51) Int. Cl.
| A23L 2/60 | (2006.01) |
| A23L 1/236 | (2006.01) |
| A23L 2/02 | (2006.01) |
| A23L 2/54 | (2006.01) |
| A23L 27/30 | (2016.01) |

(52) U.S. Cl.
CPC .............. *A23L 1/2363* (2013.01); *A23L 2/02* (2013.01); *A23L 2/54* (2013.01); *A23L 2/60* (2013.01); *A23L 27/36* (2016.08)

(58) Field of Classification Search
CPC ... A23L 1/09; A23L 1/221; A23L 2/02; A23L 2/54; A23L 2/60; A23L 27/36
USPC ......... 426/425, 431, 658; 131/275; 536/18.1
See application file for complete search history.

(56) References Cited

U.S. PATENT DOCUMENTS

| 3,723,410 | A | 3/1973 | Persinos |
| 4,082,858 | A | 4/1978 | Morita et al. |
| 4,171,430 | A | 10/1979 | Matsushita et al. |
| 4,219,571 | A | 8/1980 | Miyake |
| 4,361,697 | A | 11/1982 | Dobberstein et al. |
| 4,454,290 | A | 6/1984 | Dubois |
| 4,590,160 | A | 5/1986 | Nishihashi et al. |
| 4,599,403 | A | 7/1986 | Kumar |
| 4,612,942 | A | 9/1986 | Dobberstein et al. |
| 4,657,638 | A | 4/1987 | le Grand et al. |
| 4,892,938 | A | 1/1990 | Giovanetto |
| 4,917,916 | A | 4/1990 | Hirao et al. |
| 5,112,610 | A | 5/1992 | Kienle |
| 5,576,042 | A | 11/1996 | Fuisz |
| 5,779,805 | A | 7/1998 | Morano |
| 5,962,678 | A | 10/1999 | Payzant et al. |
| 5,972,120 | A | 10/1999 | Kutowy et al. |
| 6,031,157 | A | 2/2000 | Morita et al. |
| 6,080,561 | A | 6/2000 | Morita et al. |
| 6,204,377 | B1 | 3/2001 | Nishimoto et al. |
| 6,228,996 | B1 | 5/2001 | Zhou et al. |
| 6,706,304 | B1 | 3/2004 | Ishida et al. |
| 7,807,206 | B2 | 10/2010 | Magomet et al. |
| 7,838,044 | B2 | 11/2010 | Abelyan et al. |
| 7,862,845 | B2 | 1/2011 | Magomet et al. |
| 8,257,948 | B1 | 9/2012 | Markosyan |
| 2002/0132320 | A1 | 9/2002 | Wang et al. |
| 2003/0161876 | A1 | 8/2003 | Hansson et al. |
| 2003/0236399 | A1 | 12/2003 | Zheng et al. |
| 2006/0083838 | A1 | 4/2006 | Jackson et al. |
| 2006/0134292 | A1 | 6/2006 | Abelyan et al. |
| 2006/0142555 | A1 | 6/2006 | Jonnala et al. |
| 2007/0082102 | A1* | 4/2007 | Magomet et al. ............ 426/548 |
| 2007/0082103 | A1 | 4/2007 | Magomet et al. |
| 2007/0116800 | A1 | 5/2007 | Prakash |
| 2007/0116819 | A1 | 5/2007 | Prakash |
| 2007/0116820 | A1 | 5/2007 | Prakash |
| 2007/0116821 | A1 | 5/2007 | Prakash |
| 2007/0116822 | A1 | 5/2007 | Prakash |
| 2007/0116823 | A1 | 5/2007 | Prakash |
| 2007/0116824 | A1 | 5/2007 | Prakash |
| 2007/0116825 | A1 | 5/2007 | Prakash |
| 2007/0116826 | A1 | 5/2007 | Prakash |
| 2007/0116827 | A1 | 5/2007 | Prakash |
| 2007/0116828 | A1 | 5/2007 | Prakash |
| 2007/0116829 | A1 | 5/2007 | Prakash |
| 2007/0116830 | A1 | 5/2007 | Prakash |
| 2007/0116831 | A1 | 5/2007 | Prakash |
| 2007/0116832 | A1 | 5/2007 | Prakash |

(Continued)

FOREIGN PATENT DOCUMENTS

| BR | P10701736 | 7/2008 |
| CN | 1049666 | 3/1991 |

(Continued)

OTHER PUBLICATIONS a-Glucosyltransferase Treated Stevia, Japan's Specifications and Standards for Food Additives, VIII edition, 2009, p. 257.
Ahmed, et al., "Use of p-Bromophenacyl Bromide to Enhance Ultraviolet Detection of Water-Soluble Organic Acids (Steviolbioside and Rebaudioside B) in High-Performance Liquid Chromatographic Analysis", Journal of Chromatography, vol. 192, 1980, 387-393.
Chang, S. S. et al., "Stability Studies of Stevioside and Rebaudioside A in Carbonated Beverages", Journal of Agricultural and Food Chemistry, vol. 31, 1983, 409-412.
Chen, et al., "Enrichment and separation of rebaudioside A from stevia glycosides by a novel adsorbent with pyridyl group", Science in China, vol. 42, No. 3 1999 , 277-282.

(Continued)

*Primary Examiner* — Jyoti Chawla
(74) *Attorney, Agent, or Firm* — Briggs and Morgan, P.A.; Audrey J. Babcock

(57) ABSTRACT

The invention provides a process of preparing glucosyl Rebaudioside C composition. The glucosyl rebaudioside C composition is useful as in combination with other caloric and non-caloric sweeteners as well as non caloric sweetener in edible and chewable consumables such as various foods and beverages, confectioneries, bakery products, cookies, chewing gums, and the like.

1 Claim, 1 Drawing Sheet

(56) References Cited

U.S. PATENT DOCUMENTS

| | | | |
|---|---|---|---|
| 2007/0116833 A1 | 5/2007 | Prakash | |
| 2007/0116834 A1 | 5/2007 | Prakash | |
| 2007/0116835 A1 | 5/2007 | Prakash | |
| 2007/0116836 A1 | 5/2007 | Prakash | |
| 2007/0116837 A1 | 5/2007 | Prakash | |
| 2007/0116838 A1 | 5/2007 | Prakash | |
| 2007/0116839 A1 | 5/2007 | Prakash | |
| 2007/0116840 A1 | 5/2007 | Prakash | |
| 2007/0116841 A1 | 5/2007 | Prakash | |
| 2007/0128311 A1 | 6/2007 | Prakash | |
| 2007/0134390 A1 | 6/2007 | Prakash | |
| 2007/0134391 A1 | 6/2007 | Prakash | |
| 2007/0224321 A1 | 9/2007 | Prakash | |
| 2007/0292582 A1 | 12/2007 | Prakash et al. | |
| 2008/0064063 A1 | 3/2008 | Brandle et al. | |
| 2008/0102497 A1 | 5/2008 | Wong et al. | |
| 2008/0107775 A1 | 5/2008 | Prakash | |
| 2008/0107776 A1 | 5/2008 | Prakash | |
| 2008/0107787 A1 | 5/2008 | Prakash | |
| 2008/0108710 A1 | 5/2008 | Prakash | |
| 2008/0111269 A1 | 5/2008 | Politi et al. | |
| 2008/0226797 A1 | 9/2008 | Lee et al. | |
| 2008/0292764 A1 | 11/2008 | Prakash et al. | |
| 2008/0292765 A1 | 11/2008 | Prakash | |
| 2008/0292775 A1 | 11/2008 | Prakash | |
| 2008/0300402 A1 | 12/2008 | Yang et al. | |
| 2009/0017185 A1 | 1/2009 | Catani | |
| 2009/0053378 A1 | 2/2009 | Prakash | |
| 2009/0074935 A1 | 3/2009 | Lee | |
| 2009/0079935 A1 | 3/2009 | Harris et al. | |
| 2009/0142817 A1 | 6/2009 | Norman et al. | |
| 2009/0226590 A1 | 9/2009 | Fouache et al. | |
| 2010/0055752 A1 | 3/2010 | Kumar | |
| 2010/0056472 A1 | 3/2010 | Duan et al. | |
| 2010/0099857 A1 | 4/2010 | Evans et al. | |
| 2010/0057024 A1 | 5/2010 | Cavallini et al. | |
| 2010/0137569 A1 | 5/2010 | Abelyan et al. | |
| 2010/0189861 A1 | 7/2010 | Abelyan et al. | |
| 2010/0227034 A1 | 9/2010 | Purkayastha et al. | |
| 2010/0255171 A1 | 10/2010 | Purkayastha et al. | |
| 2010/0278993 A1 | 11/2010 | Prakash et al. | |
| 2010/0316782 A1 | 12/2010 | Shi et al. | |
| 2011/0030457 A1 | 2/2011 | Valery et al. | |
| 2011/0033525 A1 | 2/2011 | Liu | |
| 2011/0092684 A1 | 4/2011 | Abelyan et al. | |
| 2011/0104353 A1 | 5/2011 | Lee | |
| 2011/0111115 A1 | 5/2011 | Shi et al. | |
| 2011/0124587 A1 | 5/2011 | Jackson et al. | |
| 2011/0160311 A1 | 6/2011 | Prakash et al. | |
| 2011/0189360 A1 | 8/2011 | Yoo et al. | |
| 2011/0195169 A1 | 8/2011 | Markosyan et al. | |
| 2012/0164678 A1 | 6/2012 | Stephanopoulos et al. | |
| 2012/0214752 A1 | 8/2012 | Markosyan | |

FOREIGN PATENT DOCUMENTS

| | | | |
|---|---|---|---|
| CN | 1100727 | | 3/1995 |
| CN | 1112565 | | 11/1995 |
| CN | 1192447 | | 9/1998 |
| CN | 1238341 | | 12/1999 |
| CN | 1349997 | | 5/2002 |
| CN | 101200480 | | 6/2008 |
| CN | 101628924 | A * | 1/2010 |
| JP | 52005800 | | 1/1977 |
| JP | 52083731 | | 7/1977 |
| JP | 52100500 | | 8/1977 |
| JP | 52136200 | | 11/1977 |
| JP | 54030199 | | 3/1979 |
| JP | 54132599 | | 10/1979 |
| JP | 55039731 | | 3/1980 |
| JP | 55081567 | | 6/1980 |
| JP | 55092400 | | 7/1980 |
| JP | 55120770 | | 9/1980 |
| JP | 55138372 | | 10/1980 |
| JP | 55159770 | | 12/1980 |
| JP | 55162953 | 12/1980 |
| JP | 56099768 | 8/1981 |
| JP | 56109568 | 8/1981 |
| JP | 56121453 | 9/1981 |
| JP | 56121454 | 9/1981 |
| JP | 56121455 | 9/1981 |
| JP | 56160962 | 12/1981 |
| JP | 57002656 | 1/1982 |
| JP | 57005663 | 1/1982 |
| JP | 57046998 | 3/1982 |
| JP | 57075992 | 5/1982 |
| JP | 57086264 | 5/1982 |
| JP | 58020170 | 2/1983 |
| JP | 58028246 | 2/1983 |
| JP | 58028247 | 2/1983 |
| JP | 58212759 | 12/1983 |
| JP | 58212760 | 12/1983 |
| JP | 59045848 | 3/1984 |
| JP | 62166861 | 7/1987 |
| JP | 63173531 | 7/1988 |
| JP | 1131191 | 5/1989 |
| JP | 3262458 | 11/1991 |
| JP | 6007108 | 1/1994 |
| JP | 6192283 | 7/1994 |
| JP | 7143860 | 6/1995 |
| JP | 7177862 | 7/1995 |
| JP | 8000214 | 1/1996 |
| JP | 9107913 | 4/1997 |
| JP | 2000236842 | 9/2000 |
| JP | 2002262822 | 9/2002 |
| JP | 2010516764 | 5/2010 |
| KR | 20070067199 | 6/2007 |
| KR | 20080071605 | 8/2008 |
| KR | 20090021386 | 3/2009 |
| RU | 2111969 | 5/1998 |
| RU | 2123267 | 12/1998 |
| RU | 2156083 | 9/2000 |
| RU | 2167544 | 5/2001 |
| RU | 2198548 | 2/2003 |
| WO | 2005089483 | 9/2005 |
| WO | 2006072878 | 7/2006 |
| WO | 2006072879 | 7/2006 |
| WO | 2008091547 | 7/2008 |
| WO | 2009108680 | 9/2009 |
| WO | 2010118218 | 10/2010 |
| WO | 2011059954 | 5/2011 |
| WO | 2011153378 | 12/2011 |
| WO | 2012082493 | 6/2012 |
| WO | 2012082677 | 6/2012 |
| WO | 2013022989 | 2/2013 |

OTHER PUBLICATIONS

Chen, et al., "Selectivity of polymer adsorbent in adsorptive separations of stevia diterpene glycisides", Science in China, vol. 41, No. 4 1998, 436-441.

Chen, et al., "Studies on the adsorptive selectivity of the polar resin with carbonyl group on rebaudioside A", Acta Polymeric Scnica, No. 4 1999, 398-403.

Crammer, et al., "Sweet glycosides from the Stevia plant", Chemistry in Britain, Oct. 1986, 915-916, 918.

Darise et al., "Enzymic Transglucosylation of Rubusoside and the Structure-Sweetness Relationship of Steviol Bisglycosides," Agric. Biol. Chem. vol. 48(10), 1984, 2483-2488.

Dubois et al., "Diterpenoid Sweeteners. Synthesis and Sensory Evaluation of Stevioside Analogues with Improved Organoleptic Properties," J. Med. Chem. vol. 28, (1985) 93-98.

Fuh, , "Purification of steviosides by membrane and ion exchange process", Journal of Food Science, vol. 55, No. 5 1990, 1454-1457.

Fukunaga et al., "Enzymic Transglucosylation Products of Stevioside: Separation and Sweetness-evaluation," Agric. Biol. Chem. vol. 53(6) (1989) 1603-1607.

Fullas et al., "Separation of natural product sweetening agents using overpressured layer chromatography," Journal of Chromatography vol. 464 (1989) 213-219.

Hale, et al., "Amylase of Bacillus Macerans", Cereal Chemistry, vol. 28, No. 1, Jan. 1951, 49-58.

(56) References Cited

OTHER PUBLICATIONS

International Search Report and Written Opinion of PCT/US2010/055960.
International Search Report and Written Opinion of PCT/US2011/028028.
International Search Report and Written Opinion of PCT/US2011/033734.
International Search Report and Written Opinion of PCT/US2011/033737.
International Search Report and Written Opinion of PCT/US2011/033912.
International Search Report and Written Opinion of PCT/US2011/035173.
International Search Report and Written Opinion of PCT/US2011/036063, dated Aug. 5, 2011.
International Search Report and Written Opinion of PCT/US2011/047498, dated Dec. 22, 2011.
International Search Report and Written Opinion of PCT/US2011/047499, dated Dec. 22, 2011.
International Search Report and Written Opinion of PCT/US2011/064343.
International Search Report and Written Opinion of PCT/US2012/024585.
International Search Report and Written Opinion of PCT/US2012/024722.
International Search Report and Written Opinion of PCT/US2012/030210.
International Search Report and Written Opinion of PCT/US2012/043294.
International Search Report and Written Opinion of PCT/US2012/051163.
International Search Report and Written Opinion of PCT/US2012/052659.
International Search Report and Written Opinion of PCT/US2012/052665.
International Search Report and Written Opinion of PCT/US2013/030439.
Jaitak, et al., "An Efficient Microwave-assisted Extraction Process of Stevioside and Rebaudioside-A from Stevia Rebaudiana (Bertoni)", Phytochem. Anal. vol. 20 2009, 240-245.
Kennelly, "Sweet and non-sweet constituents of Stevia rebaudiana", Stevia: The genus Stevia, Taylor & Francis, 2002, 68-85.
Kinghorn, "Overview", Stevia: The genus Stevia, Taylor & Francis, 2002, 1-17.
Kitahata, S. et al., "Production of Rubusoside Derivatives by Transgalactosylation of Various b-Galactosidases", Agric. Biol. Chem., vol. 53, No. 11 1989, 2923-2928.
Kobayashi, et al., "Dulcoside A and B, New diterpene glycosides from Stevia Rebaudiana", Phytochemistry, vol. 16 1977, 1405-1408.
Kochikyan, et al., "Combined Enzymatic Modification of Stevioside and Rebaudioside A", Applied Biochemistry and Microbiology, vol. 42, No. 1, 2006, 31-37.
Kohda, et al., "New sweet diterpene glucosides from Stevia Rebaudiana", Phytochemistry, vol. 15 1976, 981-983.
Kovylyaeva, et al., "Glycosides from Stevia rebaudiana", Chemistry of Natural Compounds, vol. 43, No. 1 2007, 81-85.
Liu, et al., "Study of stevioside preparation by membrane separation process", Desalination, vol. 83 1991, 375-382.
Lobov, S. V. et al., "Enzymic Production of Sweet Stevioside Derivatives: Transglucosylation of Glucosidases", Agric. Biol. Chem., vol. 55, No. 12 1991, 2959-2965.
Montovaneli, et al., "The effect of temperature and flow rate on the clarification of the aqueous Stevia-extract in fixed-bed column with zeolites", Brazilian Journal of Chemical Engineering, vol. 21, No. 3 2004, 449-458.
Moraes, et al., "Clarification of Stevia rebaudiana (Bert.) Bertoni extract adsorption in modified zeolites", Acta Scientiarum, vol. 23, No. 6 2001, 1375-1380.

Ohta et al., "Characterization of Novel Steviol Glycosides from Leaves of Stevia rebaudiana Morita," J. Appl. Glycosi., vol. 57, 199-209, 2010.
Ohtani et al. "Chapter 7. Methods to improve the taste of the sweet principles of Stevia rebaudiana." The Genus Stevia, edited by A. Douglas Kinghorn, CRC Press 2001, Taylor and Francis, London and New York, pp. 138-159.
Phillips, K. C., "Stevia: steps in developing a new sweetener", In T.H. Grenby, Editor, Developments in Sweeteners-3, Elsevier 1987, 1-43.
Pol, et al., "Comparison of two different solvents employed for pressurised fluid extraction of stevioside from Stevia rebaudiana: methanol versus water", Anal Bioanal Chem vol. 388 2007, 1847-1857.
Prakash et al., "Development of rebiana, a natural, non-caloric sweetener," Jul. 1, 2008, Food and Chemical Toxology, vol. 46, Is. 7, Sup. 1, p. S75-S82.
Richman et al., "Fuctional genomics uncovers three glucosyltransferases involved in the synthesis of the major sweet glucosides of Stevia rebaudiana," The Plant Journal, vol. 41 (2005) 56-67.
Sakamoto et al., "Application of 13C NMR Spectroscopy to Chemistry of Natural Glycosides: Rebaudioside-C, a New Sweet Diterpene Glycoside of Stevia Rebaudiana", Chem. Pharm. Bull., vol. 25, 1977, 844-846.
Shi, et al., "Synthesis of bifunctional polymeric adsorbent and its application in purification of Stevia glycosides", Reactive & Functional Polymers, vol. 50 2002, 107-116.
Shibata et al., "Glucosylation of Steviol and Steviol-Glucosides in Extracts from Stevia rebaudiana Bertoni," Plant Physiol vol. 95, (1991) 152-156.
Starratt, et al., "Rebaudioside F, a diterpene glycoside from Stevia Rebaudiana", Phytochemistry, vol. 59 2002, 367-370.
Sweet Green Fields, LLC, "Notice to the U.S. Food and Drug Administration (FDA) that the use of Rebiana (Rebaudiosid A) derived from Stevia rebaudiana, as a Food Ingredient is Generally Recognized as Safe (GRAS)," Jan. 15, 2009, http:/www.accessdata.fda.gov/scripts/fcn/gras_notices/grn000282.pdf (obtained from the WEB on May 8, 2012) entire document esp. p. 22, Table 1.
Tanaka, O., "Improvement of taste of natural sweeteners", Pure & Appl. Chem., vol. 69, No. 4 1997, 675-683.
Teo, et al., "Validation of green-solvent extraction combined with chromatographic chemical fingerprint to evaluate quality of Stevia rebaudiana Bertoni", J. Sep. Sci, vol. 32 2009, 613-622.
United Nations' Food and Agriculture Organization/Joint Expert Committee on Food Additives (2010) Steviol Glycosides, Compendium of Food Additive Specifications, FAO JECFA Monographs 10, 17-21.
van der Maarel et al., "Properties and applications of starch-converting enzymes of the a-amylase family," Journal of Biotechnology, vol. 94 (2002) 137-155.
Vasquez, Stimulation of the Gerbil's Gustatory Receptors by Some Potently Sweet Terpenoids, J. Agric. Food Chem., vol. 41, 1305-1310, 1993.
Yamamoto, K. et al., "Effective Production of Glycosyl-steviosides by a-1,6 Transglucosylation of Dextrin Dextranase", Biosci. Biotech. Biochem. vol. 58, No. 9 1994, 1657-1661.
Yoda, et al., "Supercritical fluid extraction from Stevia rebaudiana Bertoni using CO2 and CO2+ water: extraction kinetics and identification of extracted components", Journal of Food Engineering, vol. 57 2003, 125-134.
Zell, et al., "Investigation of Polymorphism in Aspartame and Neotame Using Solid-State NMR Spectroscopy", Tetrahedron, vol. 56, 2000, 6603-6616.
Zhang, et al., "Membrane-based separation scheme for processing sweetener from Stevia leaves", Food Research International, vol. 33 2000, 617-620.

* cited by examiner

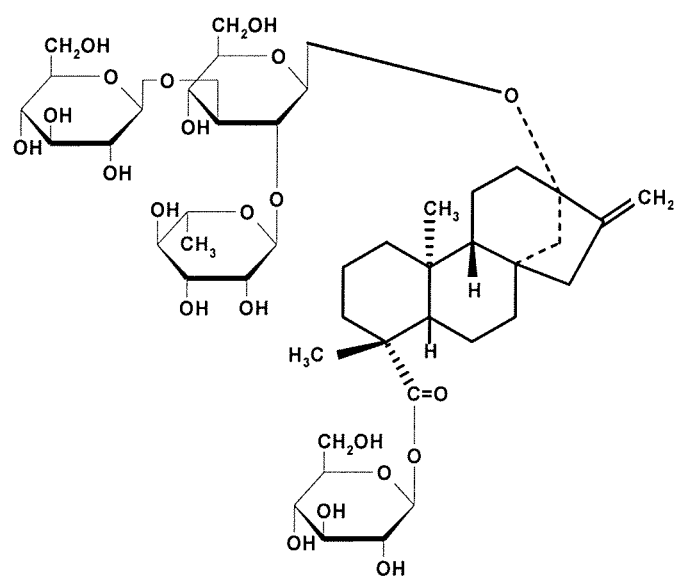
REBAUDIOSIDE C

GLUCOSYL REBAUDIOSIDE C

This application claims priority under 35 U.S.C. §119(e) from provisional U.S. Patent Application No. 61/827,941 filed May 29, 2013, the contents of which are incorporated herein by reference. This application is also a continuation-in-part of and claims the benefit of priority to U.S. patent application Ser. No. 13/110,010 filed May 18, 2011 which was published as U.S. 2011/0287164 on Nov. 24, 2011, the contents of which are incorporated herein by reference.

FIELD OF THE INVENTION

The invention relates to a process for glucosylation of sweet glycosides of *Stevia rebaudiana* Bertoni plant, and more particularly to a process for glucosylation of Rebaudioside C from *Stevia rebaudiana* Bertoni plant.

BACKGROUND OF THE INVENTION

High intensity sweeteners possess sweetness level many times exceeding that of sucrose. They are essentially non-caloric and used widely in manufacturing of diet and calorie-reduced food. Although natural caloric sweetener such as sucrose, fructose, and glucose provide the most desirable taste to consumers, they are caloric. High intensity sweeteners do not affect the blood glucose level and provide little or no nutritive value.

However, high intensity sweeteners that generally are used as sucrose substitutes possess taste characteristics different than that of sugar, such as sweet taste with different temporal profile, maximal response, flavor profile, mouth-feel, and/or adaptation behavior than that of sugar. For example, the sweet taste of some high-potency sweeteners is slower in onset and longer in duration than that of sugar and thus changes the taste balance of a food composition. Because of these differences, usage of high-potency sweetener in replacing such a bulk sweetener as sugar in a food or beverage causes disbalance in temporal and/or flavor profile. If the taste profile of high-potency sweeteners could be modified to impart desired taste characteristics, it can provide low calorie beverages and food products with taste characteristics more desirable for consumers.

On the other hand, high-potency sweeteners may have some cost and functional advantages compared to sugar. The competition among sugar and non-sugar high-potency sweeteners is tough in soft drinks industry, in countries where their use and production is permitted and also in countries with overvalued sugar prices.

At present high intensity sweeteners are used worldwide. They can be of both synthetic and natural origin.

Non-limiting examples of synthetic sweeteners include sucralose, potassium acesulfame, aspartame, alitame, saccharin, neohesperidin dihydrochalcone synthetic derivatives, cyclamate, neotame, dulcin, suosan, N—[N-[3-(3-hydroxy-4-methoxyphenyl)propyl]-L-□-aspartyl]-L-phenylalanine 1-methyl ester, N—[N-[3-(3-hydroxy-4-methoxyphenyl)-3-methylbutyl]-L-□-aspartyl]-L-phenylalanine 1-methyl ester, N—[N-[3-(3-methoxy-4-hydroxyphenyl)propyl]-L-□-aspartyl]-L-phenylalanine 1-methyl ester, salts thereof, and the like.

Non-limiting examples of natural high intensity sweeteners include Stevioside, Rebaudioside A, Rebaudioside B, Rebaudioside C, Rebaudioside E, Rebaudioside F, Steviolbioside, Dulcoside A, Rubusoside, mogrosides, brazzein, neohesperidin dihydrochalcone (NHDC), glycyrrhizic acid and its salts, thaumatin, perillartine, pernandulcin, mukuroziosides, baiyunoside, phlomisoside-I, dimethyl-hexahydrofluorene-dicarboxylic acid, abrusosides, periandrin, carnosiflosides, cyclocarioside, pterocaryosides, polypodoside A, brazilin, hernandulcin, phillodulcin, glycyphyllin, phlorizin, trilobtain, dihydroflavonol, dihydroquercetin-3-acetate, neoastilibin, trans-cinnamaldehyde, monatin and its salts, selligueain A, hematoxylin, monellin, osladin, pterocaryoside A, pterocaryoside B, mabinlin, pentadin, miraculin, curculin, neoculin, chlorogenic acid, cynarin, siamenoside and others.

At present about eleven high intensity sweeteners are used worldwide. These are acesulfame-K, alitame, aspartame, cyclamate, glycyrrhizin, NHDC, saccharin, Stevioside, sucralose, thaumatin, neotame, and Rebaudioside A.

The standard sweetening power associated with each high intensity sweetener is given in TABLE 1. However, when they are used in blends, the sweetening power can change significantly.

TABLE 1

| Sweetener | Sweetness power |
| --- | --- |
| Saccharose | 1 |
| Acesulfame-K | 200 |
| Alitame | 2000 |
| Aspartame | 200 |
| Cyclamate | 30 |
| Glycyrrhizin | 50 |
| NHDC | 1000 |
| Saccharine | 300 |
| Stevioside | 200 |
| Rebaudioside A | 450 |
| Thaumatin | 3000 |
| Sucralose | 600 |

On the other hand, 'natural' and 'organic' foods and beverages have become the "hottest area" in the food industry. The combination of consumers' desire, advances in food technology, new studies linking diet to disease and disease prevention has created an unprecedented opportunity to address public health through diet and lifestyle.

A growing number of consumers perceive the ability to control their health by enhancing their current health and/or hedging against future diseases. This creates a demand for food products with enhanced characteristics and associated health benefits, specifically a food and consumer market trend towards "whole health solutions" lifestyle. The term "natural" is highly emotive in the world of sweeteners and has been identified as one of key trust, along with "whole grains", "heart-healthy" and "low-sodium". 'Natural' term is closely related to 'healthier'.

In this respect, natural high intensity sweeteners can have better commercial potential.

*Stevia rebaudiana* Bertoni is a perennial shrub of the Asteraceae (Compositae) family native to certain regions of South America. The leaves of the plant contain from 10 to 20% of diterpene glycosides, which are around 150 to 450 times sweeter than sugar. The leaves have been traditionally used for hundreds of years in Paraguay and Brazil to sweeten local teas and medicines.

At present there are more than 230 *Stevia* species with significant sweetening properties. The plant has been successfully grown under a wide range of conditions from its native subtropics to the cold northern latitudes.

Steviol glycosides have zero calories and can be used wherever sugar is used. They are ideal for diabetic and low calorie diets. In addition, the sweet steviol glycosides possess functional and sensory properties superior to those of many high potency sweeteners.

The extract of *Stevia rebaudiana* plant contains a mixture of different sweet diterpene glycosides, which have a single base—steviol and differ by the presence of carbohydrate residues at positions C13 and C19. These glycosides accumulate in *Stevia* leaves and compose approximately 10%-20% of the total dry weight. Typically, on a dry weight basis, the four major glycosides found in the leaves of *Stevia* are Dulcoside A (0.3%), Rebaudioside C (0.6-1.0%), Rebaudioside A (3.8%) and Stevioside (9.1%). Other glycosides identified in *Stevia* extract include Rebaudioside B, D, E, and F, Steviolbioside and Rubusoside. Among steviol glycosides only Stevioside and Rebaudioside A are available in commercial scale.

The physical and sensory properties are well studied only for Stevioside and Rebaudioside A. The sweetness potency of Stevioside is around 210 times higher than sucrose, Rebaudioside A in between 200 and 400 times.

Generally production of extract includes extraction of plant material with water or water-organic solvent mixture, precipitation of high molecular weight substances, deionization, and decolorization, purification on specific macroporous polymeric adsorbents, concentration and drying.

Purification techniques include re-crystallization from various organic solvents as well as chromatographic separation. As a result, besides the highly purified steviol glycosides, substantial amount of by products with 65-75% steviol glycosides content is being generated. The amount of such "non-food grade" materials often exceeds the "main" product 2-3 times and there is a certain economic demand for re-processing of these "by-products". This possesses big technical challenge as the majority of existing commercial purification processes fail to deliver satisfactory results with initial materials containing as low as 65-75% total steviol glycosides.

On the other hand commercial preparations of steviol glycosides such as *Stevia* Extract, Rebaudioside A possess certain drawbacks substantially limiting their usage in mainstream products.

One of these disadvantages is "so-called" limited maximal response value. This is the maximal sweetness in sugar equivalents achievable by using a high intensity sweetener regardless how high the concentration of the sweetener is. For steviol glycosides this value is approx. 6-8%. This means when used "as-is" steviol glycosides cannot deliver sweetness feeling which is higher than that of 6-8% sucrose solution. Considering that majority of soft drinks contain 10-13% sucrose the usage of steviol glycosides for full sugar substitution is not possible.

It has to be noted that high intensity sweeteners' taste profile is highly dependant on the concentration and usually the higher the concentration the higher the sensation of undesirable taste components such as bitterness, licorice, lingering aftertaste. This phenomenon limits the usage of steviol glycosides further to 4-5% sucrose equivalents in order to achieve pleasant taste of a food or beverage sweetened with *stevia* sweeteners.

Rebaudioside C or Reb C (CAS No: 63550-99-2), also known as Dulcoside B, is the third most abundant sweet glycoside found in *Stevia rebaudiana*. Nevertheless its isolation and purification are one of the most challenging compared to other glycosides. Few descriptions exist in literature of processes yielding high purity Rebaudioside C.

Recent studies show that highly purified forms of Rebaudioside C possess certain valuable properties. Particularly Rebaudioside C is capable to deliver flavor and sweetness enhancing properties.

These properties multiply the significance of Rebaudioside C and attract great interest for processes of preparation of highly purified forms of Rebaudioside C.

There are few processes described in the prior arts for Rebaudioside C preparation.

U.S. Pat. No. 4,353,889 describes a process of preparation of a substance referred as "Rebaudioside C". According to the embodiment of the patent, Rebaudioside A is refluxed with strong base in aqueous methanol medium at elevated temperature. Upon completion of the reaction the mixture is cooled and acidified with sulfuric acid to yield the base hydrolysis product called "Rebaudioside C" with 99% purity. It has to be noted that the chemical formula of the compound given in the patent actually corresponds to substance currently known to art as Rebaudioside B (CAS No: 58543-17-2).

*Stevia rebaudiana* aqueous extract was re-crystallized from methanol-ethanol mixture and Reb C was recovered from obtained mixture by chromatography on silica gel (Kobayashi et al., 1977). The process employs chromatographic separation which is not suitable for application in commercial scale.

*Stevia rebaudiana* methanolic extract was re-crystallized from methanol and Reb C was recovered from obtained mother liquor by chromatography on silica gel (Sakamoto et al., 1977). Using chromatographic separation stage in process makes it difficult to apply in commercial scale.

Most of the existing processes of highly purified Reb C preparation employ techniques which are only applicable for laboratory or pilot scale production.

On the other hand there's no information about the properties of glucosylated Reb C. To our knowledge, there is no published data on the glucosylation of Reb C.

Hence, there is a need for a simple, efficient, and economical process for production of glucosylated steviol glycosides compositions comprising Reb C.

DESCRIPTION OF THE FIGURE

FIG. 1 shows the chemical structure of Rebaudioside C.

SUMMARY OF THE INVENTION

The invention relates to a process for glucosylation of sweet glycosides from *Stevia rebaudiana* Bertoni plant, and more particularly to a process for glucosylation of Rebaudioside C.

The primary objective of the invention is to develop an efficient process of glucosylating different steviol glycosides particularly Reb C from *Stevia* extract.

According to the present invention the glucosylation of Reb C was developed from steviol glycosides compositions comprising at least 20% on dry basis Reb C.

In one embodiment, the process comprises steps of:
a. providing an steviol glycosides composition comprising at least 20% of Reb C on anhydrous basis;
b. providing a donor of glucose residues;
c. dissolving the steviol glycosides composition and glucose residues donor in water;
d. adding an enzyme capable of transferring glucose residues from glucose residue donor molecule to Reb C molecule;

e. incubating the reaction mixture to obtain a glucosyl Reb C composition comprising at least 20% glucosyl Reb C and 0-20% unmodified Reb C, all percentages being on anhydrous wt/wt basis.

One aspect of the present invention provides a product comprising glucosyl Reb C composition from 0.1 ppm to 100,000 ppm, wherein the product is selected from the group consisting of food, beverage, pharmaceutical composition, tobacco, nutraceutical, oral hygienic composition, cosmetics or any other chewable, edible or drinkable consumable.

Another aspect of the present invention provides a sweetener or flavoring composition comprising glucosyl Reb C composition.

In another embodiment, the sweetener composition further comprises Rebaudioside A, enzymatically modified stevia, Rebaudioside D, a mixture of steviol glycosides with more than 95% (on dry basis) total steviol glycosides content, high intensity sweetener and natural flavor compound, caloric sweetener, or sucrose.

In another embodiment, the sweetener or flavoring composition further comprises one natural high intensity sweetener selected from the group consisting of: steviol glycosides including a purified sweet steviol glycoside mixture, stevioside, rebaudioside A, rebaudioside B, rebaudioside C, rebaudioside D, rebaudioside E, rebaudioside F, dulcoside A, dulcoside B, rubusoside, stevia, alpha-glucosyl stevia, fructosyl stevia, galactosyl stevia, beta-glucosyl stevia; siamenoside; mogroside IV; mogroside V; Luo Han Guo sweetener; monatin and its salts (monatin SS, RR, RS, SR); glycyrrhizic acid and its salts; curculin; thaumatin; monellin; mabinlin; brazzein; hernandulcin; phyllodulcin; glycyphyllin; phloridzin; trilobtain; baiyunoside; osladin; polypodoside A; pterocaryoside A; pterocaryoside B; mukurozioside; phlomisoside I; periandrin I; abrusoside A; cyclocarioside I; and combinations thereof.

It is to be understood that the foregoing descriptions and specific embodiments shown herein are merely illustrative of the best mode of the invention and the principles thereof, and that modifications and additions may be easily made by those skilled in the art without departing for the spirit and scope of the invention, which is therefore understood to be limited only by the scope of the appended claims.

DETAILED DESCRIPTION OF THE INVENTION

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

According to the present invention the glucosylation of Reb C was developed from starting material comprising steviol glycosides with at least 20% on dry basis Reb C content.

In one embodiment, the process comprises steps of:
a. providing a steviol glycosides composition comprising at least 20% of Reb C on anhydrous basis;
b. providing a donor of glucose residues;
c. dissolving the steviol glycosides composition and glucose residues donor in water;
d. adding an enzyme capable of transferring glucose residues from glucose residues donor molecule to Reb C molecule;
e. incubating the reaction mixture to obtain a glucosyl Reb C composition comprising at least 20% glucosyl Reb C and 0-20% unmodified Reb C, all percentages being on anhydrous wt/wt basis.

In one embodiment the steviol glycosides composition of step (a) contains 20-30%, or 30-40%, or 40-60%, or 60-70%, or 70-80%, or 80-90%, or 90-100% Reb C, preferably 20-40% Reb C (wt/wt anhydrous basis).

In another embodiment the donor of glucose residues in step (b) is selected from group including but not limited to starch, liquefied starch, hydrolyzed starch, partially hydrolyzed starch, maltodextrin, maltooligosaccharides, cyclodextrins, and other compounds known in prior art to be used as glucose residue donor in glucosylation reactions.

Yet in another embodiment the (wt/wt) ratio of initial steviol glycoside composition and glucose residues donor is ranging from 1:1,000 to 1,000:1. Preferably from 2:1, or 1:1, or 1:2.

In one embodiment the total solids content of the solution obtained in step (c) by dissolving steviol glycosides composition and glucose residues donor in water, ranges from 0.1% to 99%, preferably 30-40%.

In one embodiment the enzyme of step (d) is cyclomaltodextrin glucanotransferase (CGTase, EC 2.4.1.19). The enzyme may be added by several batches throughout the process or by one batch.

In another embodiment the enzyme of step (d) is selected from group including but not limited to immobilized enzyme, crude enzyme, purified enzyme, semi-purified enzyme, stabilized enzyme, preserved enzyme, live microbial cell, microbial cell lysate, immobilized microbial cell, or any other form of biocatalyst known to art.

In one embodiment the process is carried out as batch process. However any other type of process known to art, including but not limited to continuous process, semi-batch process etc can be utilized as well Yet in another embodiment the glucosyl Reb C composition of step (e) comprises, Reb C, mono-glucosyl Reb C, di-glucosyl Reb C, tri-glucosyl Reb C, tetra-glucosyl Reb C, penta-glucosyl Reb C, hexa-glucosyl Reb C, hepta-glucosyl Reb C, octa-glucosyl Reb C, nona-glucosyl Reb C, deca-glucosyl Reb C, and higher glucosyl derivatives of reb C and mixtures thereof.

In another embodiment the glucosyl Reb C composition of step (e) comprises, also Reb A, mono-glucosyl Reb A, di-glucosyl Reb A, tri-glucosyl Reb A, tetra-glucosyl Reb A, penta-glucosyl Reb A, hexa-glucosyl Reb A, hepta-glucosyl Reb A, octa-glucosyl Reb A, nona-glucosyl Reb A, deca-glucosyl Reb A, and higher glucosyl derivatives of reb A and mixtures thereof.

In another embodiment the glucosyl Reb C composition of step (e) comprises, also stevioside, mono-glucosyl stevioside, di-glucosyl stevioside, tri-glucosyl stevioside, tetra-glucosyl stevioside, penta-glucosyl stevioside, hexa-glucosyl stevioside, hepta-glucosyl stevioside, octa-glucosyl stevioside, nona-glucosyl stevioside, deca-glucosyl stevioside, and higher glucosyl derivatives of stevioside and mixtures thereof.

In another embodiment, the process further comprises one or more steps listed below executed in any order and number of repeats:
f. inactivating the enzyme by heat treatment or any other method known to art,
g. passing the glucosyl Reb C composition through ion exchange resin(s), such as anion exchange or cation exchange resins, h. passing the glucosyl Reb C composition through a membrane or filter with a pore size ranging from 1 Angstrom to 1,000 micrometers. Non limiting examples of membranes include reverse osmosis membranes, nanofiltration, ultrafiltration, microfiltration membranes etc, i. contacting the glucosyl Reb C composition to activated carbon or any other agent known to have decolorizing effect, j. additionally treating the glucosyl Reb C composition with enzyme(s) selected from the group including but not limited to CGTase, alpha amylase, beta amylase, glucoamylase or any other enzyme known to have hydrolytic or transglycosidase effect, k. subjecting the glucosyl Reb C composition to any type of chromatographic separation known to art, including but not limited, ion exchange chromatography, adsorption chromatography, simulated moving bed (SMB) chromatography etc. The chromatographic system used in chromatographic separation may comprise 1-16 chromatographic columns packed with activated carbon, bentonite, zeolite, modified silicagel, unmodified silicagel, ion exchange resins, polymeric adsorbents, macroporous adsorbents, DVB resins, acrylic resins etc. The separation may be carried out by mobile phase comprising ethyl acetate, n-propanol, iso-propanol, acetone, ethanol, methanol, acetonitrile, water. Any other chromatographic system and media known to those skilled in art can be used to conduct the separation, l. producing particles from glucosyl Reb C composition ranging from 0.0001 micron to 1 cm, m. producing various polymorphic forms from glucosyl Reb C composition, which differ from each other by X-ray diffraction trace, physico-chemical and organoleptic characteristics, n. passing the glucosyl Reb C composition through any known macroporous adsorption resin and eluting the adsorbed glycosides by aqueous alcohol comprising 0.01% to 100% alcohol. Non limiting examples of alcohol include methanol, ethanol, n-propanol, iso-propanol etc, o. drying the glucosyl Reb C composition, by spray dryer, flash dryer, vacuum dryer belt dryer, fluid bed dryer, freeze dryer, or any other drying apparatus known to dry a liquid into dry form, p. crystallizing the glucosyl Reb C composition from water, organic solvents or aqueous organic solvent to separate its components, q. liquefying the glucose residues donor by any enzyme known to have such effect, r. subjecting the glucosyl reb C composition to any type of extraction, including but not limited to, solid-liquid extraction, liquid-liquid extraction etc.

The HPLC analysis of initial steviol glycosides composition was carried out using an Agilent Technologies 1200 Series (USA) equipped with Zorbax-NH2 column (4.6×250 mm, 5um) using acetonitrile-water 80:20, (v/v) mobile phase and UV detector at 210 nm as described in FAO JECFA Monographs 5 (2008).

The HPLC analysis of the glucosyl steviol glycoside and glucosyl Reb C compositions was performed on Agilent Technologies 1200 Series (USA) liquid chromatograph, equipped with Zorbax-NH2 (4.6×250 mm) column. The mobile phase was acetonitrile-water gradient from 80:20, v/v (0-2 min) to 50:50, v/v (2-70 min). A diode array detector set at 210 nm was used as the detector.

The obtained glucosyl Reb C compositions can be used as sweetness enhancer, flavor enhancer and sweetener in various food and beverage products. Non-limiting examples of food and beverage products include carbonated soft drinks, ready to drink beverages, energy drinks, isotonic drinks, low-calorie drinks, zero-calorie drinks, sports drinks, teas, fruit and vegetable juices, juice drinks, dairy drinks, yoghurt drinks, alcohol beverages, powdered beverages, bakery products, cookies, biscuits, baking mixes, cereals, confectioneries, candies, toffees, chewing gum, dairy products, flavored milk, yoghurts, flavored yoghurts, cultured milk, soy sauce and other soy base products, salad dressings, mayonnaise, vinegar, frozen-desserts, meat products, fish-meat products, bottled and canned foods, tabletop sweeteners, fruits and vegetables.

Additionally the glucosyl Reb C compositions can be used in drug or pharmaceutical preparations and cosmetics, including but not limited to toothpaste, mouthwash, cough syrup, chewable tablets, lozenges, vitamin preparations, and the like.

The compositions can be used "as-is" or in combination with other sweeteners, flavors and food ingredients.

Non-limiting examples of sweeteners include steviol glycosides, stevioside, rebaudioside A, rebaudioside B, rebaudioside C, rebaudioside D, rebaudioside E, rebaudioside F, dulcoside A, steviolbioside, rubusoside, as well as other steviol glycosides found in *Stevia rebaudiana* Bertoni plant and mixtures thereof, *stevia* extract, Luo Han Guo extract, mogrosides, high-fructose corn syrup, corn syrup, invert sugar, fructooligosaccharides, inulin, inulooligosaccharides, coupling sugar, maltooligosaccharides, maltodextins, corn syrup solids, glucose, maltose, sucrose, lactose, aspartame, saccharin, sucralose, sugar alcohols.

Non-limiting examples of flavors include lemon, orange, fruity, banana, grape, pear, pineapple, bitter almond, cola, cinnamon, sugar, cotton candy, vanilla flavors.

Non-limiting examples of other food ingredients include flavors, acidulants, organic and amino acids, coloring agents, bulking agents, modified starches, gums, texturizers, preservatives, antioxidants, emulsifiers, stabilisers, thickeners, gelling agents.

The following examples illustrate preferred embodiments of the invention.

Example 1

Preparation of Rebaudioside C 10 kg of *stevia* extract containing 10.1% (on dry basis) rebaudioside C was dissolved in 30 liters of 95% ethanol at 40° C. and cooled to 20° C. 5 g of highly purified rebaudioside A crystals were added as starter and the mixture was further incubated for 2 hours. The crystals of rebaudioside A (with 95.4% (on dry basis) rebaudioside A content) were separated and the filtrate was dried to obtain 4.9 kg powder with 20.1% rebaudioside C content.

The powder was dissolved in 15 liters of 90% methanol solution at 45° C. and cooled to 20° C. 2 g of highly purified Stevioside was added as a starter and the mixture was incubated for 48 hrs. Then the mixture was filtered to obtain 15 liters of filtrate and 4.8 kg of wet crystals. The filtrate was mixed with 15 liters of ethanol and seeded with 2 g of high purity rebaudiside A as a starter. Then it was incubated for 24 hours at 10° C. for crystallization. Precipitated crystals were separated and dried to result in 0.25 kg of dry powder with 39.8% rebaudioside C content. The crystals were suspended in 0.5 liters of 80% ethanol solution and incubated at 35° C. for 2 hours. After incubation the crystals were separated and dried to yield 111.3 g of rebaudioside A with 97.1% purity. The filtrate was dried to obtain 138 g powder with 70.9% rebaudioside C content.

Example 2

Purification of Rebaudioside C 100 g of rebaudioside C prepared as per EXAMPLE 1 with 70.9% rebaudioside C content was dissolved in 200 mL of 90% methanol at 50° C. and cooled down to 10° C. 0.5 g of high purity rebaudioside A was added and the mixture was incubated at 10° C. for 24 hours. The mixture was filtered to separate the crystals. The crystals were dried to yield 19.1 g of Rebaudioside A with 97.3% purity. The filtrate was dried to yield 80.7 g of rebaudioside C with 87.6% purity.

Example 3

Refining of Rebaudioside C by Re-Crystallization 100 g of rebaudioside C prepared as per EXAMPLE 2 was dissolved in 200 mL of 99% Methanol at 50° C. and cooled down to 5° C. 1 g of highly purified rebaudioside C was added as starter and the mixture was incubated at 5° C. for 24 hours. The crystals were separated by filtration and dried under vacuum at 55° C. to yield 80.3 g of rebaudioside C with 98.1% purity.

Example 4

Refining of Rebaudioside C by Chromatography 10 g of rebaudioside C prepared according to EXAMPLE 2 was dissolved in 20 mL of solvent comprising ethylacetate, n-propanol, ethanol and water with 7:2:0.5:0.5 ratio. A glass column (60×2.5 cm) packed with Kieselgel 60 (Merck, Germany) was equilibrated with mobile phase comprising ethylacetate, n-propanol, ethanol and water with 7:2:0.5:0.5 ratio and the sample was passed through the column at SV=1.0 hr-1. The fractions with high rebaudioside C content were combined and dried to yield 7.5 g of rebaudioside C with 98.0% purity.

Example 5

Preparation of CGTase

A strain of *Bacillus stearothermophilus* St-88 was inoculated in 2,000 liters of sterilized culture medium containing 1.0% starch, 0.25% corn extract, 0.5% (NH4)2SO4, and 0.2% CaCO3 (pH 7.0-7.5) at 56° C. for 24 hrs with continuous aeration (2,000 L/min) and agitation (150 rpm). The obtained culture broth was filtered using Kerasep 0.1 μm ceramic membrane (Novasep, France) to separate the cells. The cell-free permeate was further concentrated 2-fold on Persep 10 kDa ultrafilters (Orelis, France). The activity of the enzyme was determined according to Hale, Rawlins (1951). A crude enzyme preparation with activity of about 2 unit/mL was obtained.

Example 6

Preparation of Glucosyl *stevia* Composition 100 g of tapioca starch was suspended in 300 mL of water (pH 6.5). 40 units of CGTase obtained according to EXAMPLE 5 were added, and the liquefaction of starch was carried out at 80° C. for about one hour to dextrose equivalent about 15. The pH of reaction mixture was adjusted to pH 2.8 by hydrochloric acid and the mixture was boiled at 100° C. during 5 minutes to inactivate the enzymes. After cooling to 65° C., the pH was adjusted to pH 6.0 with sodium hydroxide solution. 100 g stevia extract produced by PureCircle (JiangXi) Co., Ltd. (China), containing stevioside 29.2%, Rebaudioside A 54.3%, Rebaudioside C 9.0%, Rebaudioside F (1.7%) and other glycosides amounting to total steviol glycosides content of about 96.4% was added to liquefied starch and stirred until a homogeneous solution was obtained. 200 units of CGTase was added to the solution and the mixture was held at a temperature of 65° C. for 24 hours under continuous agitation. The mixture was boiled at 100° C. during 5 minutes to inactivate the enzyme. After cooling to 65° C., 20 grams of activated carbon was added and the mixture was heated to 75° C. and held for 30 minutes. The mixture was filtered and the filtrate was diluted with water to 5% solids content and passed through columns packed with Amberlite FPC23 (H+) and Amberlite FPA51 (OH−) ion exchange resins. The desalted solution was concentrated at 60° C. under vacuum, and dried into a powder form using laboratory spray dryer. 190 grams of product was obtained (Sample 1).

Example 7

Preparation of Glucosyl Rebaudioside C Composition 100 g of tapioca starch was suspended in 300 mL of water (pH 6.5). 40 units of CGTase obtained according to EXAMPLE 5 were added, and the liquefaction of starch was carried out at 80° C. for about one hour to dextrose equivalent about 15. The pH of reaction mixture was adjusted to pH 2.8 by hydrochloric acid and the mixture was boiled at 100° C. during 5 minutes to inactivate the enzymes. After cooling to 65° C., the pH was adjusted to pH 6.0 with sodium hydroxide solution. 100 g of powder with 20.1% rebaudioside C content prepared according to EXAMPLE 1 and also containing Rebaudioside A 14.9%, Stevioside 4.8%, Rebaudioside F 3.1%, of Rebaudioside D 3.5%, was added to liquefied starch and stirred until a homogeneous solution was obtained. 200 units of CGTase was added to the solution and the mixture was held at a temperature of 65° C. for 24 hours under continuous agitation. The mixture was boiled at 100° C. during 5 minutes to inactivate the enzyme. After cooling to 65° C., 20 grams of activated carbon was added and the mixture was heated to 75° C. and held for 30 minutes. The mixture was filtered and the filtrate was diluted with water to 5% solids content and passed through columns packed with Amberlite FPC23 (H+) and Amberlite FPA51 (OH−) ion exchange resins. The desalted solution was concentrated at 60° C. under vacuum, and dried into a powder form using laboratory spray dryer. 191 grams of product was obtained (Sample 2).

Example 8

Analysis of Sample 1 and 2

The HPLC analysis of the Sample 1 and Sample 2 was performed on Agilent Technologies 1200 Series (USA) liquid chromatograph, equipped with Zorbax-NH2 (4.6×250 mm) column. The mobile phase was acetonitrile-water gradient from 80:20, v/v (0-2 min) to 50:50, v/v (2-70 min). A diode array detector set at 210 nm was used as the detector. The results are summarized in Table 2.

TABLE 2

| Compounds | Content, % | |
|---|---|---|
| | Sample 1 | Sample 2 |
| Stevioside | 1.7 | 0.5 |
| Rebaudioside C | 0.9 | 4.1 |

TABLE 2-continued

| Compounds | Content, % | |
|---|---|---|
| | Sample 1 | Sample 2 |
| Rebaudioside A | 3.9 | 2.1 |
| Glucosyl-Stevioside derivatives* | 31.9 | 15.9 |
| Glucosyl-Rebaudioside A derivatives* | 42.1 | 22.3 |
| Glucosyl-Rebaudioside C derivatives* | 7.6 | 43.4 |

*Note: Glucosyl derivatives include glucosylated derivatives of respective steviol glycoside (stevioside, rebaudioside A and rebaudioside C) containing from 1 to 9 additional glucose residues Example 9

Low-Calorie Orange Juice Drink

Orange concentrate (35%), citric acid (0.38%), ascorbic acid (0.05%), sodium benzoate (0.02%), orange red color (0.01%), orange flavor (0.20%), and sweetener composition (as per Table 2) were blended and dissolved completely in the water (up to 100%) and pasteurized. The sensory evaluation of the samples by 10 panelists is summarized in Table 3.

TABLE 3

| Sample/sweetener composition | Comments | | |
|---|---|---|---|
| | Flavor | Aftertaste | Mouth feel |
| Sucrose 5% | Sweet and balanced flavor | Clean taste, no aftertaste | Full |
| Rebaudioside A 250 ppm | Sweet, rounded and balanced flavor | Slight bitter aftertaste | Acceptable |
| Rebaudioside A 100 ppm and 50 ppm of Sample 1 | Sweet, rounded and balanced flavor | Slight bitter aftertaste | Acceptable |
| Rebaudioside A 100 ppm and 50 ppm of Sample 2 | Pleasant sucrose-like sweetness, balanced flavor | Clean taste, no aftertaste | Full |

Similarly juices from other fruits, such as apple, lemon, apricot, cherry, pineapple, etc. can be prepared.

Example 10

Low-Calorie Carbonated Drink

Carbonated beverage samples with following composition (Table 4) utilizing different sweetener compositions were prepared.

TABLE 4

| Ingredients | Quantity, % |
|---|---|
| Cola flavor | 0.340 |
| Phosphoric acid (85%) | 0.100 |
| Sodium citrate | 0.310 |
| Sodium benzoate | 0.018 |
| Citric acid | 0.018 |
| Sweetener composition | see Table 5 |
| Sucrose | 6.0% |
| Carbonated water | to 100 |

The samples with different sweeteners were evaluated by 10 panelists. Evaluation results are summarized in TABLE 5.

TABLE 5

| Sensory attribute, (number of panelists) | Sweetener composition used in sample (see Table 4) | | | |
|---|---|---|---|---|
| | Sucrose 6% | Reb A 250 ppm | Reb A 100 ppm and 50 ppm of Sample 1 | Reb A 100 ppm and 50 ppm of Sample 2 |
| Bitter taste | 0 | 3 of 10 panelists | 2 of 10 panelists | 0 |
| Astringent taste | 0 | 2 of 10 panelists | 1 of 10 panelists | 0 |
| Aftertaste | 0 | 2 of 10 panelists | 1 of 10 panelists | 1 of 10 panelists |
| Quality of sweetness | Clean | Clean (6 of 10 panelists) | Clean (7 of 10 panelists) | Clean (9 of 10 panelists) |
| Overall evaluation | Satisfactory (10 of 10 panelists) | Satisfactory (8 of 10 panelists) | Satisfactory (8 of 10 panelists) | Satisfactory (9 of 10 panelists) |

The above results show that the beverages prepared using combination of highly purified Rebaudioside A and Sample 2 possess good organoleptic characteristics.

While the foregoing description and examples describe and enable the present invention, they in no way serve to limit the scope of the present invention. Those skilled in the art will appreciate that many other modifications, variations and alternative embodiments of the present invention are possible within the full scope of the present invention, which is set forth in the following claims.

I claim:

1. A process for preparing a glucosyl Rebaudioside C composition comprising the steps of:
   a. providing a *stevia* extract;
   b. dissolving the extract in a first aqueous alcoholic solution to obtain a first mixture, wherein the first aqueous alcoholic solution is an ethanol-water solution, with 75-99% ethanol;
   c. inducing crystallization in the first mixture;
   d. filtering the first mixture to obtain a first precipitate and a first filtrate;
   e. drying the first filtrate;
   f. dissolving the dried first filtrate in a second aqueous alcoholic solution to obtain a second mixture, wherein the second aqueous alcoholic solution is a methanol-water solution with 70-99% methanol;
   g. inducing crystallization in the second mixture;
   h. filtering the second mixture to obtain a second precipitate and a second filtrate;
   i. adding a third aqueous alcoholic solution into the second filtrate to obtain a third mixture, wherein the third aqueous alcoholic solution is an ethanol-water solution with 10-99% ethanol;
j. inducing crystallization in the third mixture;
k. filtering the third mixture to obtain a third precipitate and a third filtrate;
l. suspending the third precipitate in a fourth aqueous alcoholic solution to obtain a fourth mixture, wherein the fourth aqueous alcoholic solution is an ethanol-water solution with 80-99% ethanol;
m. filtering the fourth mixture to obtain a fourth precipitate and a fourth filtrate;
n. drying the fourth filtrate to yield purified Rebaudioside C;
o. providing a donor of glucose residues;
p. dissolving the purified Rebaudioside C and the donor of glucose residues in water;
q. adding an enzyme capable of transferring glucose residues from glucose residues donor molecule to a Rebaudioside C molecule;
r. incubating the reaction mixture to obtain the glucosyl Rebaudioside C composition comprising at least 20% glucosyl Rebaudioside C and 0-20% unmodified Rebaudioside C, all percentages being on an anhydrous wt/wt basis;

wherein the glucosyl Rebaudioside C composition is useful as a sweetener, a sweetness enhancer, or a flavor enhancer.

* * * * *